Dec. 11, 1962 W. G. LEVIN ETAL 3,067,451
BALL BEARING MOUNTING FOR LUGGAGE AND THE LIKE
Filed Aug. 29, 1960
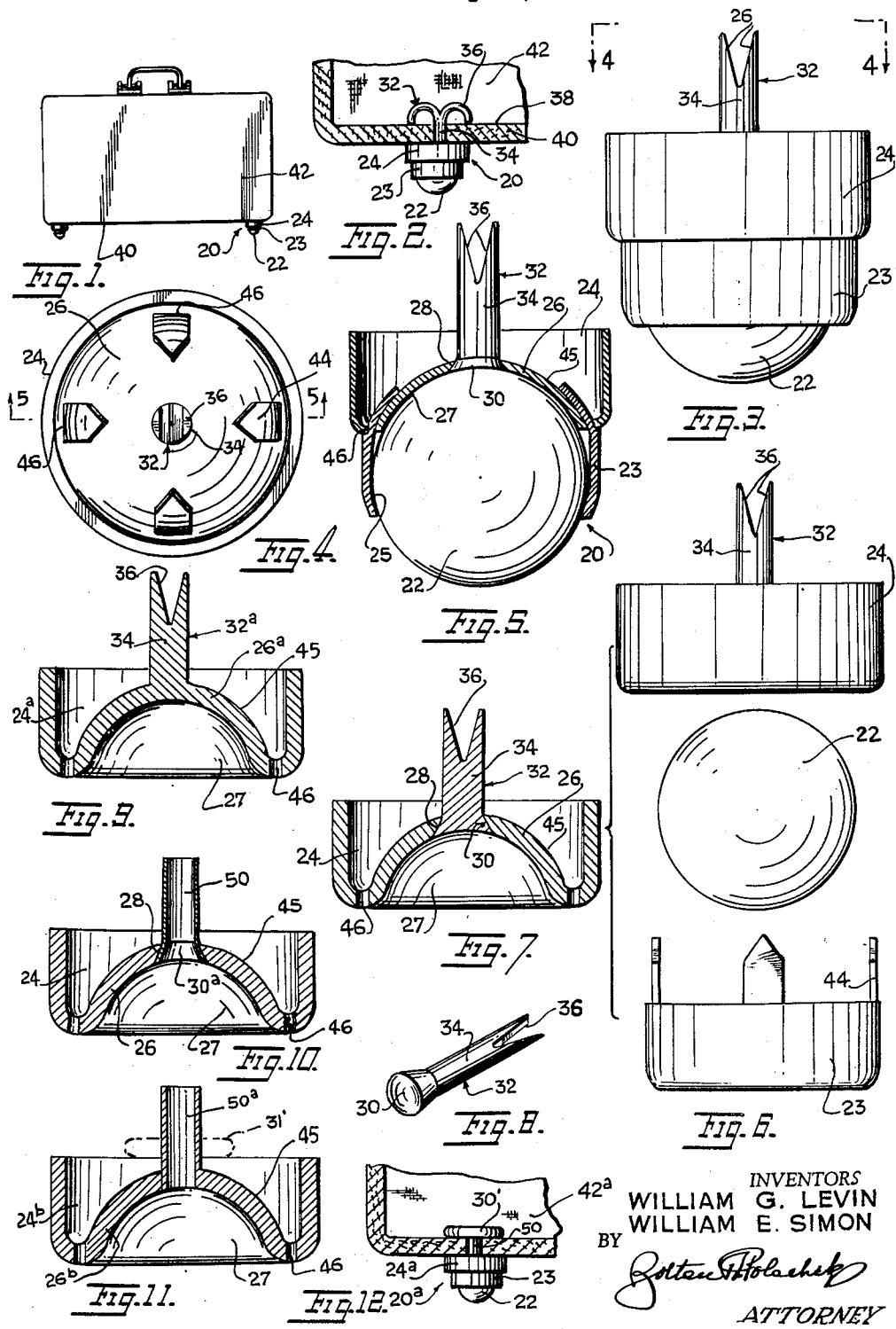
INVENTORS
WILLIAM G. LEVIN
WILLIAM E. SIMON
BY
ATTORNEY United States Patent Office 3,067,451
Patented Dec. 11, 1962

1

3,067,451
BALL BEARING MOUNTING FOR LUGGAGE
AND THE LIKE
William G. Levin, Oakridge Parkway, and William E.
Simon, 609 Highland Ave., both of Peekskill, N.Y.
Filed Aug. 29, 1960, Ser. No. 52,581
1 Claim. (Cl. 16—24)

This invention concerns an improved bearing support or caster of the ball or roller type for sample cases, chests, cases for musical instruments, trunks, suitcases and the like.

Heretofore most ball bearing casters employed on luggage and other containers have been attached to base plates or flanges which were first nailed, screwed or riveted to the undersides of the containers and then the ball bearing casters were attached to the base plates or flanges. Other ball bearing casters had screw type fasteners which necessitated screwing directly into the article, and others necessitated pre-drilling of holes in the article for insertion. This procedure required a considerable expenditure of time and labor, increased manufacturing cost, employed costly materials, time, labor, parts, etc. Provision of costly machinery was necessary and manufacturing cost was unduly high. All this mitigated against the use of ball bearing casters on inexpensive containers and luggage, even though their use would increase the utility and sales appeal of the luggage.

It is a principal object of the present invention to overcome the above mentioned difficulties and disadvantages by providing a ball or roller bearing caster for an article of luggage or other container in which means for fastening the caster to its support is provided so that the caster can be permanently mounted on the underside of an article of luggage in a quick, easy and inexpensive manner, in a single stroke by a machine without predrilling or slow hand labor.

A further object is to provide a ball or roller bearing caster for luggage and the like wherein the caster has rivet or eyelet means on the body of the caster, for mounting the caster on the luggage.

A still further object is to provide a ball or roller bearing caster for luggage and the like wherein the caster has fastening means integral with the body of the caster for mounting the caster on the luggage.

Another object is to provide a ball or roller bearing caster for luggage or the like wherein the caster has rivet or eyelet means integral with the body of the caster for mounting the caster on the luggage.

Still another object is to provide a ball or roller bearing caster for luggage or the like wherein the caster has fastening means for mounting the caster directly on the luggage without a base plate, flange or other intermediary support.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a suitcase provided with casters according to the invention.

FIG. 2 is a sectional view on an enlarged scale through a corner of the suitcase of FIG. 1, showing details of the caster mounting.

FIG. 3 is a side elevational view on an enlarged scale of the ball bearing caster of FIG. 1 prior to attachment to the luggage.

FIG. 4 is a top plan view of the caster taken on line 4—4 of FIG. 3.

2

FIG. 5 is a vertical sectional view taken on line 5—5 of FIG. 4.

FIG. 6 is an exploded side elevational view of the several parts of the caster of FIGS. 3–5.

FIG. 7 is a vertical sectional view through a ball bearing seat forming part of the caster.

FIG. 8 is a perspective view of a rivet pin employed with the bearing seat.

FIGS. 9, 10 and 11 are sectional views similar to FIG. 7 of other ball bearing seats.

FIG. 12 is a sectional view similar to FIG. 2 showing details of another caster mounting.

Referring to FIGS. 1 through 6, there is shown a caster assembly 20 including a ball 22 rotatable in a retainer ring 23 and seated in an annular bearing member 24. The bearing member 24 has a spherically curved dome 26 in the concave side 27 of which seats the upper portion of ball 22. A countersunk hole 28 is formed in the center of the dome. A tapered or conical head 30 of a rivet 32, best shown in FIGS. 5, 7 and 8, fits in hole 28. The shank 34 of the rivet extends upwardly from the dome 26. The end of shank 34 is split to form fingers 36 which can be bent over to engage the inner side 38 of the bottom 40 of a suitcase or other article of luggage or container 42, as best shown in FIG. 2. The fingers 36 are shown in straight form in FIGS. 3–8.

The retainer ring 23 is an annular member with a concave inner cylindrical wall 25 which rotatably engages the ball 22 around its diametral plane perpendicular to the axis of the rivet 32. The ring 23 has a plurality of circumferentially spaced upstanding fingers 44 which fit through slots 46 at the bottom of seat 24. The fingers 44 can be bent over to engage the outer convex side 45 of the dome 26 as best shown in FIGS. 4 and 5.

To assemble the caster 20, ball 22 will first be inserted in the ring 23. Rivet 32 will then be inserted through hole 28 in dome 26. The fingers 44 of the ring will then be inserted in slots 46 of member 24 and will be bent over to secure the ball between dome 26 and ring 23. The caster 20 can then be mounted at the underside of the article of luggage by forcing the shank 34 through the bottom of the luggage at a selected location. Prior drilling or perforating of the bottom of the luggage, whether it is wood, plastic, fiber, metal, etc., is not necessary to permit passage of the split end of the shank of the rivet therethrough. Pressure will be applied to the bottom or exposed end of the ball 22 to force the shank of the rivet through the bottom of luggage. The fingers 36 will then be spread to complete the mounting of the caster on the luggage.

In commercial practice, a puch-press type of machine can attach the caster to the luggage in one rapid stroke. No base plates nor mounting flanges will be required to secure the caster. The luggage would be placed upon an anvil of the machine which would have a die to spread the ends of the rivet while a driving member would push the shank of the rivet through the wall of the luggage, and would spread the rivet fingers by coaction with the die. The machine could be powered by foot, hydraulic, mechanical or other means.

In FIG. 9, the bearing member 24$^a$ has rivet 32$^a$ integrally formed with the dome 26$^a$ of the seat. This structure makes it possible to omit one step in the assembly of the caster since the rivet does not need insertion in hole 28 as required for member 24.

In FIG. 10, a hollow tube 50 having a flared head 30$^a$ is shown seated in hole 28 of dome 26. This tube can be pressed by a suitable die to form a bead or ring 30′ as shown in FIG. 12 which will securely and permanently attach the caster 20$^a$ to the article of luggage 42$^a$.

In FIG. 11, the tube 50$^a$ is shown integrally formed with the dome 26$^b$ of the bearing member 24$^b$. The bead 30' into which the upper end of the tube will be rolled is shown by dotted lines in FIG. 11. The structure of FIG. 11 makes it possible to omit the step of insertion of a loose tube in the dome of the seat as required for the structure of FIG. 10. The caster employing the bearing member and tube of FIG. 10 will be assembled with the ball 22 and ring 23 in the same manner as described for the caster 20 of FIGS. 1–7.

Regardless of the form of caster seat used, the step of attachment of the caster to the luggage will be by the single stroke of the attachment machine which pushes the shank of the rivet or tube through the wall of the luggage and against a die to spread the rivet or roll the tube to form a tight engagement with the inner side of the luggage wall. The mounting of the ball bearing caster will be permanent. The caster can be attached rapidly at minimum cost in time and labor and with no expenditure for materials and parts such as nails, screws, mounting plates, etc.

It will be understood that the invention contemplates roller bearings as well as ball bearings and that an eyelet might be used in place of a rivet.

This improved combined ball bearing and rivet or eyelet takes the place of the usual rivets on the bottom support of the suitcase to keep the suitcase or other article off of the ground or other supporting surface and also makes it easy to move a heavy suitcase and the like over the ground or the like without actually carrying the suitcase.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A ball bearing caster for an article of luggage or the like having a wall with an opening therein, said caster comprising a bearing member having an annular hollow body with one end closed with a depressed semispherical dome portion, the juncture between the body and dome portion having spaced slots therein, a ball loosely seated in the dome portion, a device for retaining the ball in position in the dome portion including an annular body portion surrounding the ball, spaced fingers protruding from one end of the body portion, through the slots in the bearing member and clamped over the dome portion, the other end of the annular body portion bent inwardly and engaging the ball outwardly of the horizontal diameter thereof, and an elongated rivet secured at one end to the center of the dome portion and protruding outwardly of the annular body, the other end of the rivet being split, forming fingers adapted to extend through the opening in the wall and being bent into fastening relation with the wall.

References Cited in the file of this patent

UNITED STATES PATENTS

| | | |
|---|---|---|
| 843,153 | Kuhsiek | Feb. 5, 1907 |
| 1,806,945 | Kusterle | May 26, 1931 |
| 1,965,175 | Dolan | July 3, 1934 |
| 2,766,475 | Becker | Oct. 16, 1956 |

FOREIGN PATENTS

| | | |
|---|---|---|
| 8,585 | Great Britain | June 18, 1903 |
| 11,815 | Great Britain | June 25, 1898 |